(12) United States Patent
Bucher et al.

(10) Patent No.: US 9,874,439 B2
(45) Date of Patent: Jan. 23, 2018

(54) ROUGHNESS MEASURING INSTRUMENT FOR USE IN A MACHINE TOOL AND METHOD FOR MEASURING ROUGHNESS IN A MACHINE TOOL

(71) Applicant: BLUM-NOVOTEST GmbH, Gruenkraut-Gullen (DE)

(72) Inventors: Heribert Bucher, Tettnang (DE); Wolfgang Reiser, Vogt (DE); Norbert Moersch, Wangen (DE)

(73) Assignee: Blum-Novotest GmbH (DE)

( * ) Notice: Subject to any disclaimer, the term of this patent is extended or adjusted under 35 U.S.C. 154(b) by 134 days.

(21) Appl. No.: 15/021,914

(22) PCT Filed: Sep. 3, 2014

(86) PCT No.: PCT/EP2014/068717
§ 371 (c)(1),
(2) Date: Mar. 14, 2016

(87) PCT Pub. No.: WO2015/036299
PCT Pub. Date: Mar. 19, 2015

(65) Prior Publication Data
US 2016/0231108 A1 Aug. 11, 2016

(30) Foreign Application Priority Data
Sep. 13, 2013 (DE) .................. 10 2013 015 237

(51) Int. Cl.
*G01B 5/28* (2006.01)
*G01B 11/30* (2006.01)
(52) U.S. Cl.
CPC .............. *G01B 11/303* (2013.01); *G01B 5/28* (2013.01)
(58) Field of Classification Search
CPC .................... G01B 11/303; G01B 5/28
(Continued)

(56) References Cited

U.S. PATENT DOCUMENTS 3,250,012 A 5/1966 Hilton et al.
5,299,361 A * 4/1994 Fiedler .................. G01B 3/002
33/559
(Continued)

FOREIGN PATENT DOCUMENTS

DE 19947001 A1 4/2000
DE 10206146 A1 9/2002
(Continued)

OTHER PUBLICATIONS

Precitool Werzeughandel GmbH & Co. KG: Precitool Präzisionswerkzeuge, Precisom 225. Neuenstein, Sep. 30, 2011; 8 pgs.
(Continued)

*Primary Examiner* — G. Bradley Bennett
(74) *Attorney, Agent, or Firm* — Tarolli, Sundheim, Covell & Tummino LLP

(57) ABSTRACT

Multidirectional roughness measurement insert for determining a measured variable that is characteristic of the roughness of a surface, having a carrier body on which a stylus holder is arranged for holding a stylus, an analog sensor, which converts the movements of the carrier body into measurement signals that are characteristic of the roughness of a surface of workpiece, a stylus to be coupled to the carrier body, comprising a rod-shaped shaft and a scanning head mounted on the shaft, wherein the scanning head is at least one section of a test body, which is essentially rotationally symmetrical to at least one section of the rod-shaped shaft, or wherein the scanning head is at least one section of an essentially rotationally symmetrical test body, which is arranged on a distal end of at least one section of the rod-shaped shaft.

16 Claims, 8 Drawing Sheets

(58) Field of Classification Search
USPC .................................. 33/501.03, 503, 559
See application file for complete search history.

(56) References Cited

U.S. PATENT DOCUMENTS

| | | | | |
|---|---|---|---|---|
| 5,491,904 | A * | 2/1996 | McMurtry | G01B 5/012 33/558 |
| 5,659,969 | A * | 8/1997 | Butler | G01B 11/007 33/556 |
| 7,284,337 | B2 * | 10/2007 | Brenner | G01B 7/012 33/503 |
| 2002/0059041 | A1 | 5/2002 | Mills | |
| 2005/0166413 | A1 * | 8/2005 | Crampton | B25J 13/088 33/503 |
| 2010/0119104 | A1 * | 5/2010 | Mamour | G01B 5/0032 382/100 |
| 2014/0211828 | A1 * | 7/2014 | Moersch | G01B 21/04 374/142 |
| 2015/0101205 | A1 * | 4/2015 | Jensen | G01B 5/012 33/503 |
| 2015/0204653 | A1 * | 7/2015 | Przygodda | G01B 21/045 33/503 |

FOREIGN PATENT DOCUMENTS

| | | |
|---|---|---|
| DE | 102007041272 A1 | 3/2009 |
| DE | 10262188 B4 | 5/2010 |

OTHER PUBLICATIONS

Kaneko, Makoto, and Toshio Tsuji. "A whisker tracing sensor with 5 um sensitivity." Proceedings of the 2000 IEEE Intl. Conference on Robotics and Automation. Apr. 2000.†

Tsujimura, Takeshi, and Tetsuro Yabuta. "Object detection by tactile sensing method employing force/torque information." IEEE Transactions on robotics and Automation 5.4 (1989): 444-450.†

Fend, Miriam, et al. "An active artificial whisker array for texture discrimination." Proceedings of the 2003 IEEE/RSJ Intl. Conference on Intelligent Robots and Systems. Oct. 2003.†

\* cited by examiner
† cited by third party

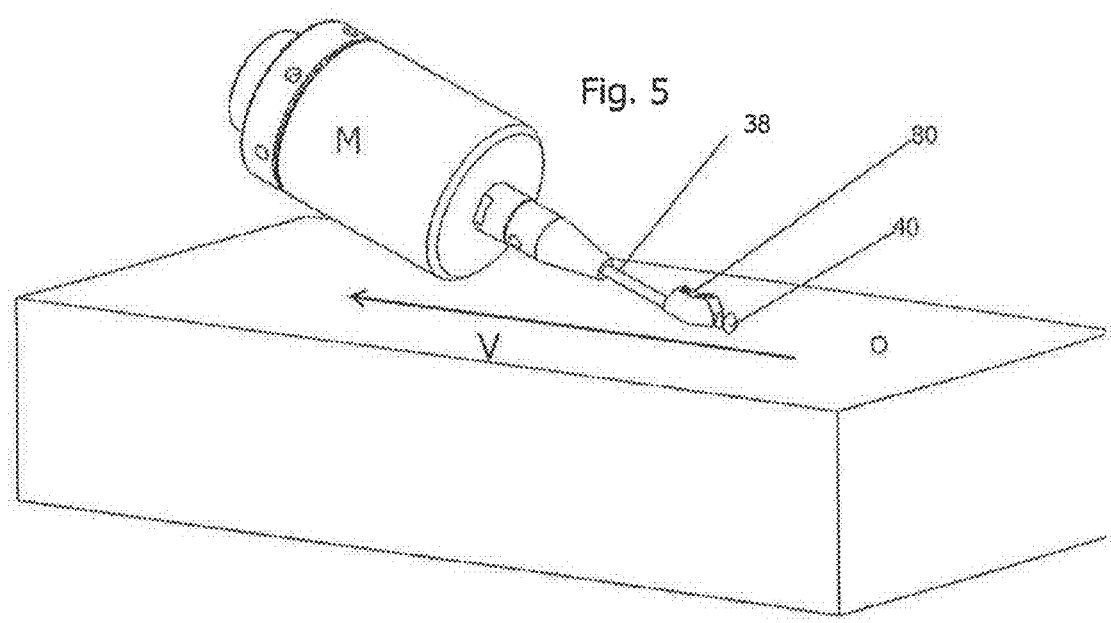
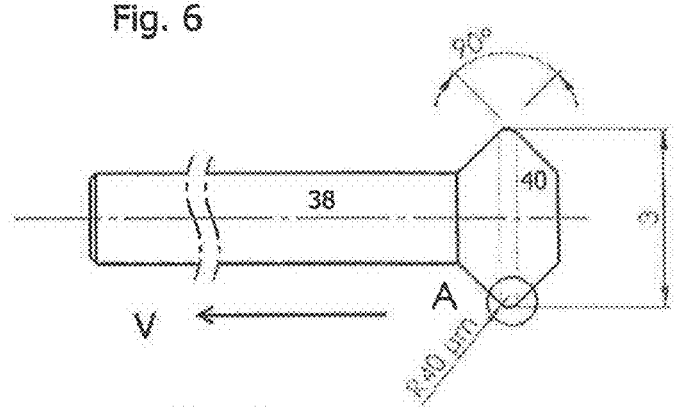
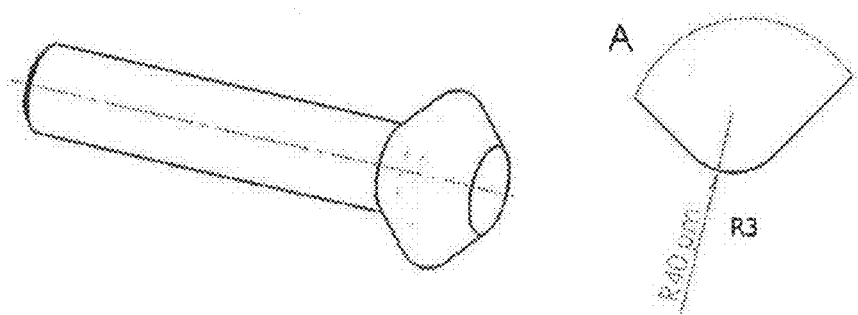

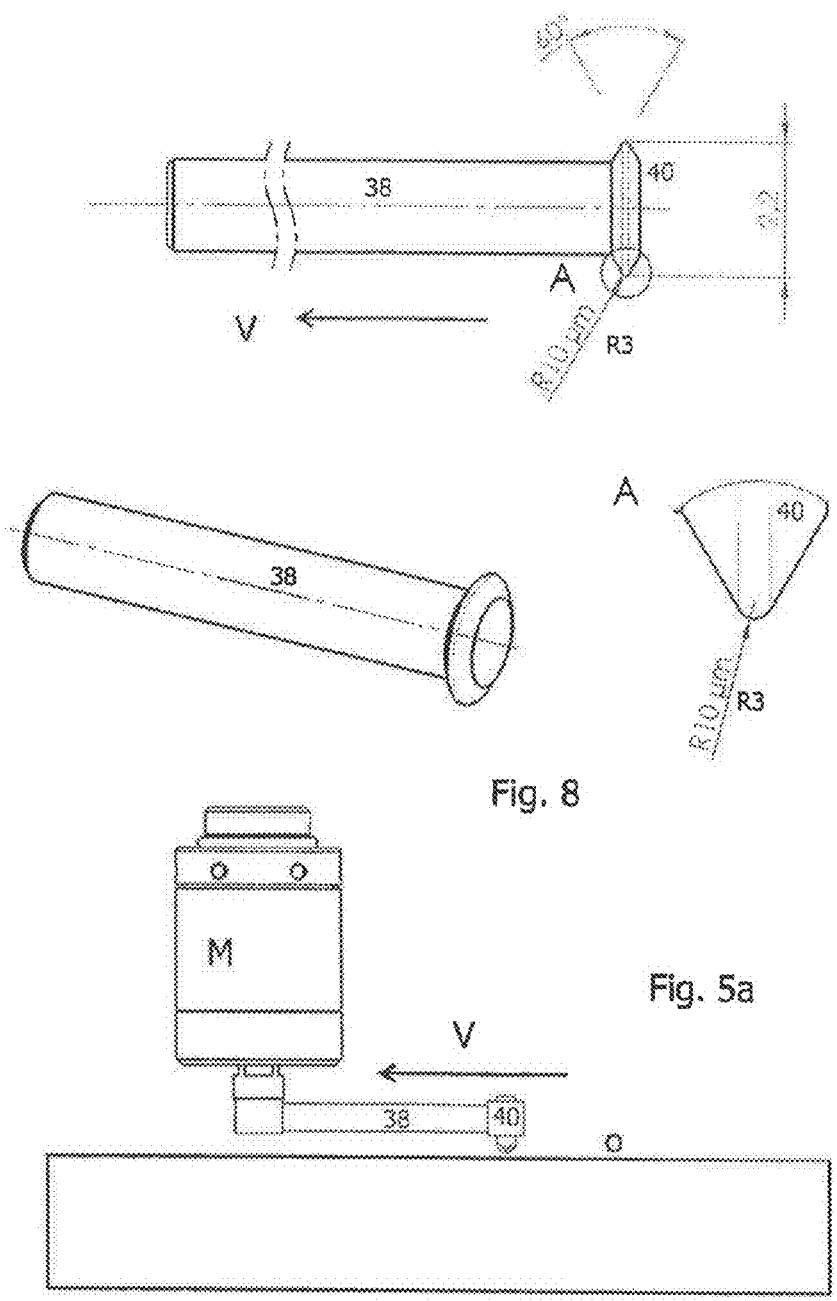

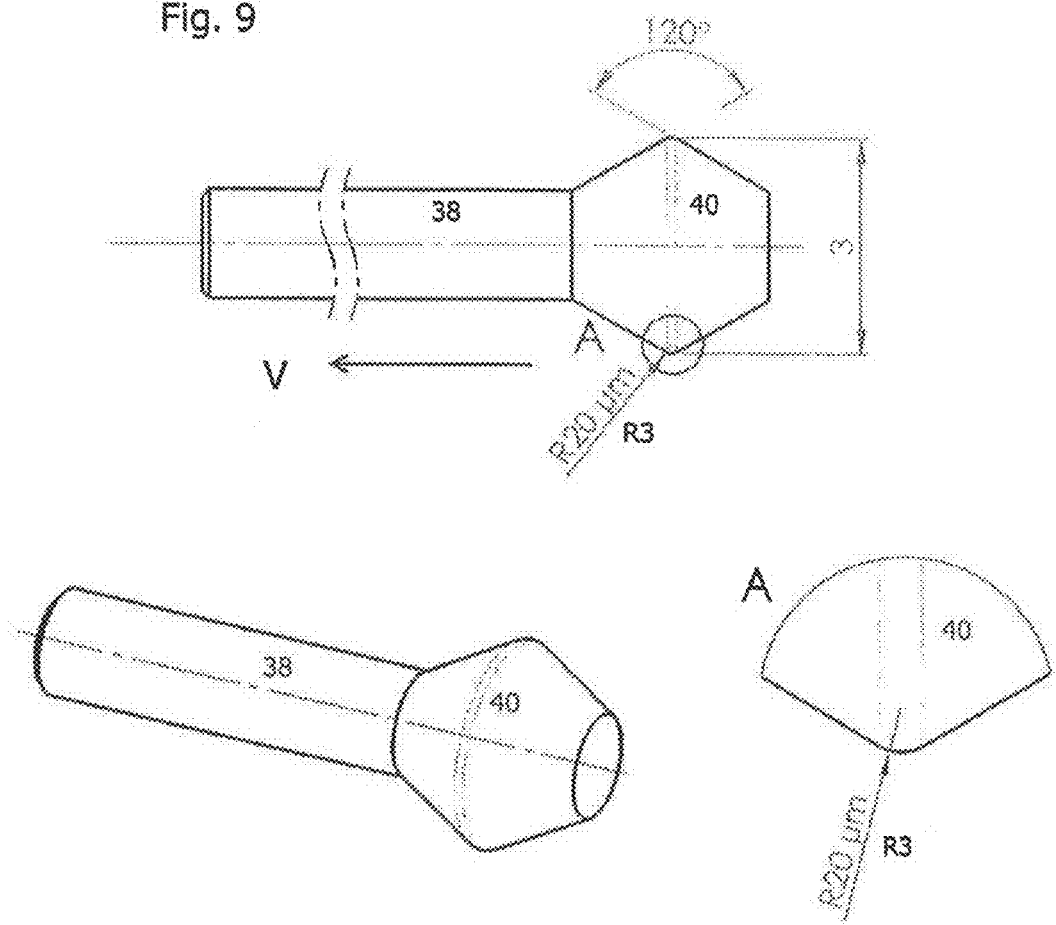

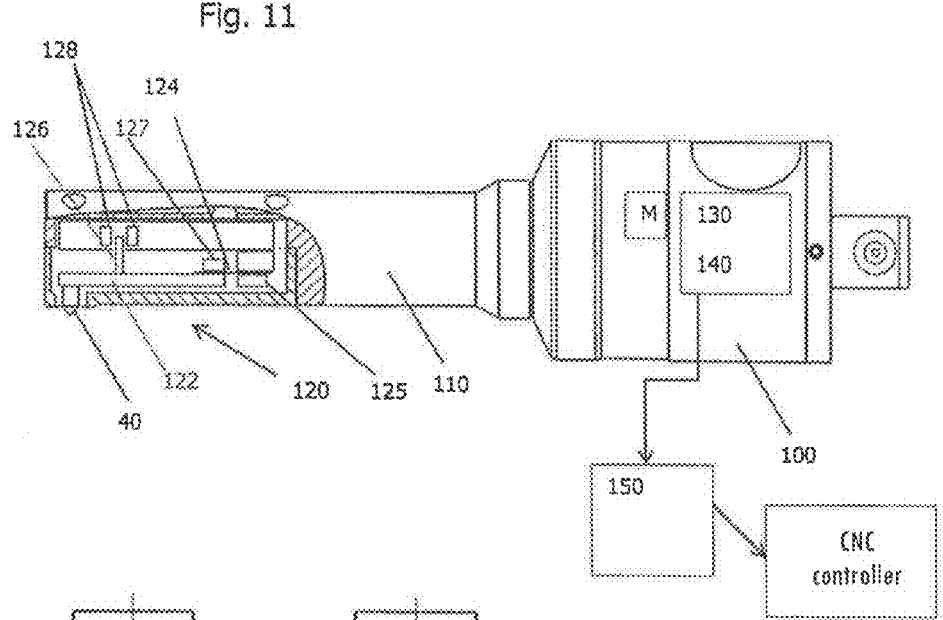
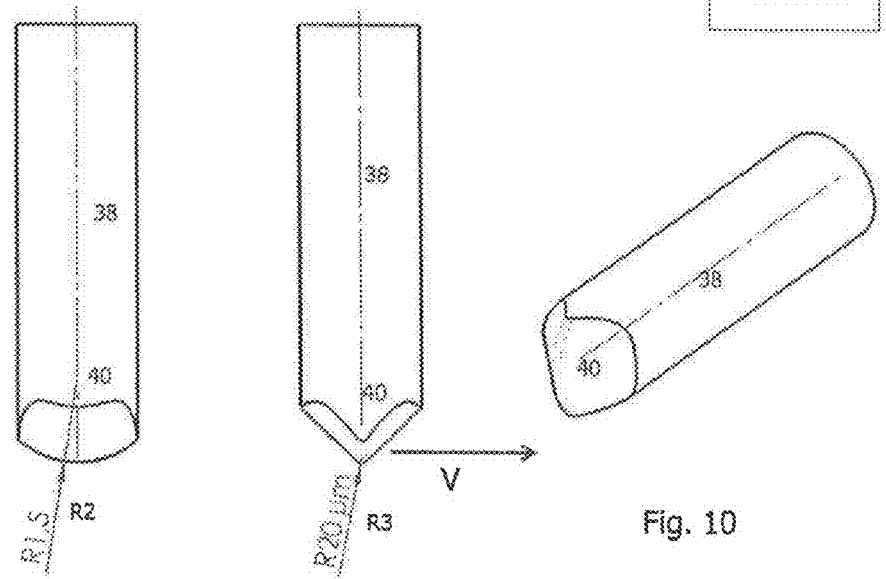

ROUGHNESS MEASURING INSTRUMENT FOR USE IN A MACHINE TOOL AND METHOD FOR MEASURING ROUGHNESS IN A MACHINE TOOL

CROSS-REFERENCE TO RELATED APPLICATION

This application is a U.S. National Stage Application filed under 35 U.S.C. §371 of PCT/EP2014/068717, filed Sep. 3, 2014, and entitled ROUGHNESS MEASURING INSTRUMENT FOR USE IN A MACHINE TOOL AND METHOD FOR MEASURING ROUGHNESS IN A MACHINE TOOL, which claims the benefit of German Patent Application No. 10 2013 015 237.2, filed on Sep. 13, 2013, and ROUGHNESS MEASURING INSTRUMENT FOR USE IN A MACHINE TOOL AND METHOD FOR MEASURING ROUGHNESS IN A MACHINE TOOL. The entire contents of each of the above-identified patent applications are incorporated herein by reference.

INTRODUCTION

A method for measuring the roughness of a workpiece machined in a machine tool is described here. The corresponding device components, such as the measurement sensor equipped specifically for this purpose and the stylus tip specifically equipped for this purpose, are also explained. Details in this regard are defined in the claims, but the description and the drawings also contain relevant information about the structure and functioning as well as variants of the method and the device components.

BACKGROUND

In the case of a workpiece machined in a machine tool, one definitive requirement of its surface is that it must be manufactured inexpensively from the standpoint of the function to be fulfilled by the surface of the workpiece (e.g., bearing surface, conductivity, visible surface, adhesive strength, friction, seal). To do so, the properties of the surface (e.g., low friction, large contact area, defined minimum roughness, sharp tips, low abrasion) must be defined as precisely as possible and verified within the context of production, so that the intended function can be optimally satisfied by the surface.

Real workpiece surfaces (actual surfaces) deviate from their ideal shape (ideal surface). These differences are subdivided into several categories. The actual surface is divided into waves of different wavelengths. The wavelength decreases with the order of the deviations in shape (first order: deviation in shape; second order: waviness; third order: roughness-grooves; fourth order: roughness-scoring, flakes, domes).

Tactile measurement instruments are often used to determine characteristic surface values on workpieces. With tactile measurement instruments, a diamond tip is moved over the surface for a determination of the roughness. This instrument has an inductive converter. A sensor with a diamond tip travels over the surface of the workpiece at a right angle to the direction of the groove, and the perpendicular stroke of the stylus tip is converted into an electric signal in the inductive converter. This measurement signal of the primary profile is usually entered into a computer processor with the help of an analog-digital converter.

Such a surface testing instrument operates unidirectionally, i.e., the sensor with the diamond tip can be drawn in only one direction relative to the workpiece surface. This surface testing device has three components: the sensor, the feed mechanism and the evaluation unit with display and documentation.

The sensor converts the vertical movement of the stylus tip into an electric signal. To do so, the sensor has the inductive converter and a stylus tip in a high-precision mount. In addition, the sensor may also have a skid. There are numerous different sensor shapes with a wide variety of geometric shapes to be measured, such as surfaces, waves, boreholes, involutes, etc. Basically, a distinction is made between single-skid sensors, dual-skid sensors and reference plane sensors. Sensors with skids are used mainly in hand-held devices. The skid follows the ripple or waviness. It acts as a high-pass filter and does not take into account the macroscopic shape of the profile. Skid sensors do not provide accurate information about shape and waviness. Such sensors are used mainly in workshops. The reference plane sensor system performs measurements against a reference surface and thus supplies an almost undistorted map of the primary profile. Diamond cones with a rounded tip are used as the stylus. Nominal values for the stylus tip include the tip radius (e.g., 2 µm, 5 µm or 10 µm) and the cone angle of the diamond cone, i.e., its tip, at 60° or 90°, for example.

The feed unit guides the sensor over the workpiece surface continuously and at a constant speed. A distinction is made between feed units with or without a reference plane and rotary feed units. Most measurement instruments have a feed unit with a built-in reference plane. These make it possible to use sensors with and without skids. Feed units without a reference plane only allow the use of sensors with skids. Only feed units with a built-in plane of reference in combination with a sensor without a skidless sensor allow accurate determination of the shape, waviness and roughness. The precision of the shape measurement depends primarily on the precision of the reference plane. A rotary feed unit rotates a cylindrical specimen beneath the stationary sensor. Concentricity errors in a workpiece can be eliminated by using sensors with skids.

However, this type of surface testing device is problematical when used in the production of workpieces inasmuch as the workpiece must be unchucked from the spindle on the machine tool and introduced into the surface testing device in order to measure its roughness. This is a disadvantage because rechucking of the workpiece in the machine tool usually results in a loss of dimensional stability in further machining in relation to the machining steps performed previously. The surface properties of a workpiece are therefore usually not tested until after completion of the machining in the machine tool. However, reworking is then possible only in exceptional cases. Thus, for example, failure to conform to the required surface properties will cause rejection of a workpiece.

The machining operation must therefore be stopped, and the working area of the machine tool must be made accessible to a worker in order to test the surface properties of the workpiece during the machining of same in the machine tool. Then, by using a manual surface testing device, the worker can check on whether the workpiece has the required surface properties.

Next, the measurement result must be analyzed and evaluated to ascertain:
a) whether the required surface property has been reached and the workpiece is acceptable;
b) if the required surface property has not been achieved, whether the workpiece can be reworked even if it is not acceptable; or c) if the required surface property has not been achieved, whether the workpiece is not acceptable and also cannot be reworked.

Now the machining may be continued, if necessary,

However, this is so time-consuming that it cannot be carried out for inspecting the required surface property on each individual workpiece, although it can be used for statistical testing of a manufacturing lot.

Furthermore, within the framework of statistical testing, it is possible to ascertain:

a) whether the workpiece is acceptable;
b) whether the machining parameters (feed, rotational speed, cutting depth, etc.) are acceptable, and
c) whether the machining conditions are acceptable (vibration of the machine tool, spindle rotation, etc.).

Furthermore, many surfaces are not even accessible to portable testing devices.

In addition, because of the given geometric relationships and measurement principles, measurement of the surface property of a borehole in a workpiece using known surface testing devices can be carried out in the longitudinal direction of the borehole but not along the circumference. Thus it is impossible in terms of space, for example, to guide a sensor with a diamond tip along a circumferential line of a borehole with 5 mm to 150 mm, for example, over the surface of the borehole in the workpiece and thereby detect the stroke of the stylus tip in a direction orthonormal to the surface of the borehole. Such measurements have been possible in the past only by using special instruments under laboratory conditions.

Consequently, the evaluation of surface roughness has been possible so far only as a downstream control step or as a manual operation on the workpiece while it is chucked. Despite wear or micro eruptions on the blade, the manufacturing dimension in many machining steps may still be within the tolerance or the intervention limits. However, the surface roughness may already be outside of specification. The missing element for monitoring surface quality near the process is a device for measuring roughness, which is used in a fully automatic operation in the machine tool. Neither the manual internal roughness measurement nor the traditional external roughness measurement provides such a practical approach.

Devices and methods for measuring a contour in a machine tool are known from the prior art. In this context, for example, the document DE 10 2007 041 272 A1 describes a measurement system with a multidimensional measurement sensor arrangement for a contact measurement with stationary and rotating tools in a machine tool. The measurement system is disclosed with different sensor elements having a pyramidal or (truncated) conical shape for performing the contour measurement. However, only the dimensions of a stationary tool are determined with the measurement sensor here. This arrangement is not suitable for performing measurements on a workpiece.

Another multidirectional measurement sensor for carrying out contour measurements is known from DE 102 62 188 B4, which has a holder for replaceable styluses. This document also describes different styluses having spherical or disk-shaped scanning heads. In addition, scanning heads having a plurality of hemispherical and disk-shaped stylus geometries that can be used independently of the direction of contact have been described.

One device for measuring roughness is known from DE 102 06 146 A1. This document discloses a vibration detection system having a stylus construction with a stylus but is embodied as an inclined cylinder having a disk-shaped contact point.

The brochure "Precision tools, Precicom 225" from the company Precitool Werkzeughandel GmbH & Co. KG discloses styluses and stylus systems for measuring contour and roughness. This document discloses two conical stylus tips with a diamond intended for measuring roughness.

Another device and another method for measuring contour and roughness are described in DE 199 47 001 A1. This document describes an instrument for measuring the surface contour and roughness which is suggesting the measuring force at an assumed value when at least the stylus or the stylus holder has been replaced.

Finally, US 2002/0 059 041 A1 discloses a device and a method for measuring contour and roughness in a machine tool. The device can be mounted instead of the tool in a machine tool.

Problem

For measuring the surface property, in particular roughness of subsections of surface on a workpiece, a method and/or a device are to be made available for increasing productivity and for maintaining the highest possible quality demands.

Approach

Therefore, a multidirectional roughness measuring insert for determining a measurement variable that is characteristic of the roughness of a surface is proposed, comprising a carrier body, on which a stylus holder is arranged for holding a stylus, an analog sensor, which converts the movements of the carrier body into measurement signals that are characteristic of the roughness of a surface of a workpiece, a stylus that can be connected to the carrier body and includes a rod-shaped shaft and a scanning head mounted on the shaft, wherein the scanning head is at least one portion of an at least essentially rotationally symmetrical test body in relation to a portion of the rod-shaped shaft, or wherein the scanning head is at least one portion of an essentially rotationally symmetrical test body, which is arranged on a distal end of at least one portion of the rod-shaped shaft. The essentially rotationally symmetrical test body has a double conical shape or a double truncated conical shape. A region of the largest diameter (equator) of the test body is designed as the contact point with a surface of a workpiece to be measured, wherein the contact point is formed by two double conical or truncated double conical lateral surfaces and the contact point is rounded in the region of the largest diameter of the test body, This arrangement allows the use of a measuring sensor that performs an analog measurement in a spindle in a machine tool instead of using a tool. To do so, a measurement sensor having an analog measurement function is combined with one of the styluses described here to perform roughness measurements. The measuring sensor is a measuring sensor that performs an analog scan and is used as the replacement for the roughness measurement in the spindle of the machine tool, transmitting the measured data or roughness values calculated in a processor in the measurement sensor or the like (via an infrared or wireless interface) or in a hard-wired action to the controller of the machine tool. A measurement sensor that performs an analog scan supplies a measurement signal, which reflects an increase and a decrease in the deflection of the stylus of the measurement insert. This is to be seen in contrast with a digital scanning measurement sensor, which supplies an on-off signal or an off-on signal only when the stylus is deflected out of its resting position by a predetermined amount.

One variant of such a measurement sensor functions with a rotationally symmetrical measuring unit, for example, in which an analog measurement signal is generated from the shadow of a miniature light barrier. The start of the shadow of the light barrier is detected by deflection of the stylus out of its resting position by a predetermined amount. The analog measurement signal may also reflect the rise and fall in the shadow, occurring when the stylus of the measurement insert is deflected to a greater or lesser extent. An analog measurement signal is generated in this way, The variants of the roughness measurement insert presented here are multidirectional inasmuch as a surface of a workpiece can be scanned from any direction due to the rotationally symmetrical measuring unit in combination with the specific stylus designs.

For example, it is thus possible with the multidirectional roughness measurement inserts to insert the stylus into a borehole or a recess cut into a workpiece and then to scan laterally on the wall of the borehole or the milled recess in any orientation of the roughness measurement insert. This is impossible with traditional roughness measurement devices because when using the diamond cone tip, a measurement can be performed only in the direction of its cone tip.

Using the multidirectional roughness measurement inserts, which are to be inserted into a spindle of a machine tool, the machine tool is used as a feed device. In addition, the machine tool also supplies the required reference plane.

In one variant of the multidirectional roughness measurement insert, it is designed with a housing in which an annular support bearing is formed, defining an X, Y bearing plane and a central axis Z of the roughness measurement insert that is normal to the former. The roughness measurement insert has a carrier body on which a stylus holder is arranged centrally to hold a stylus. The roughness measurement insert additionally has a transmission element, which is displaceably guided along the central axis Z in the housing to convert any deflection of the carrier body out of its resting position and into linear movements. In its resting position, the transmission element is aligned with the central axis Z in at least some sections. The roughness measurement insert also has an analog sensor that converts the linear movements of the transmission element into measurement signals that are characteristic of the roughness of a surface of a workpiece. A stylus-shaped component or the stylus comprising the rod-shaped shaft and the scanning head mounted on the shaft is coupled to the transmission element. The scanning head of the multidirectional roughness measurement insert comprises at least one section of a test body, which is essentially rotationally symmetrical to the central axis Z.

The analog sensor here may be a light barrier of the type described above.

With the multidirectional roughness measurement insert, the rod-shaped shaft may be coupled directly or indirectly to the transmission element in a linear extension or may be bent at an angle of approx. 0° to approx. 40°, coupled directly or indirectly to the transmission element. The rod-shaped shaft may be connected to the transmission element or to the carrier body, bent at an angle of approx. 20° to approx. 30°, preferably approx. 25°. If one surface cannot be reached with such an arrangement, a bit of 90° in the shaft is also possible.

With the multidirectional roughness measurement insert, the contact point may be formed by at least one sections of two double cone or double truncated cone lateral surfaces wherein the contact point is rounded in the region of the largest diameter of the test body.

The contact point may be defined as a function of the expected surface roughness, the path in the direction of advance of the workpiece or of the roughness measurement insert traveled per revolution or per stroke, the forward feed or the tool geometry, the tool geometry [sic] and the tool strength.

The contact point of the test body of the multidirectional roughness measurement insert may have a radius of approx. 0.4 mm to approx. 3 mm, a respective cone angle of approx, 30° to approx. 70° in the range of the largest diameter or circumference or radius. It holds here that at the largest circumference, i.e., at the equator of the test body, it does not have a circular shape but instead may also have an elliptical shape or some other cross-sectional shape that deviates from the circular.

The contact point of the test body of the multidirectional roughness measurement insert may have an edge radius of approx. 5 μm to approx. 50 μm in the region of the largest diameter. The curvature of the contact point of the test body may have a constant value or the curvature may change along a curved region of the contact point of the test body. The latter variant detects embodiments in which the edge does not have an edge rounding to be described with a radius at the largest diameter or at the largest circumference, i.e., at the equator of the test object, but instead has a parabolic edge form or a spline-shaped edge form or some other edge form.

In the multidirectional roughness measurement insert, the contact point of the test body may have a double conical shape or a double truncated conical shape with a radius in the range of the largest diameter from approx. 1.5 mm to approx. 5 mm or from approx. 0.4 mm to approx. 3 mm, an edge radius of approx. 5 μm to approx. 50 μm and a respective cone angle of approx, 30° to approx. 130°. In one variant, the two cone angles may be approx, 90°, the radius in the region of the largest diameter may be approx, 1.5 mm, and the edge radius may be approx. 40 μm. In another variant, the two cone angles may be approx. 120°, the radius in the region of the largest diameter may be approx. 1.1 mm and the edge radius may be approx, 10 μm. In another variant, the two cone angles may be approx. 60°, the radius in the region of the largest diameter may be approx. 1.5 mm and the edge radius may be approx. 20 μm.

The contact point of the test body of the multidirectional roughness measurement insert may have a forward direction oriented at least approximately in the axial direction of the largest radius.

The multidirectional roughness measurement insert may be designed with a processing unit coupled to the analog sensor in order to determine from the measurement signals at least one measurement variable that is characteristic of a surface wherein the processing unit is arranged either in the housing of the roughness measurement insert or is arranged separately thereof.

The measurement of the roughness with this roughness measurement insert depends greatly on the ability of the scanning head to detect unevenness and then to maintain precision at the point of contact. A multidirectional roughness measurement insert of the type described here has a stylus which physically comes in contact with a surface to be measured and has a measured value converter for converting the movement of the stylus into an electric signal, which is then processed further. The part of the stylus that is in contact with the surface is the scanning head. The scanning head is designed with a profile shape adapted to the measurement task integrated into the production sequence of the workpiece. Based on its finite shape, some profiles of the scanning head have a greater effect on or a better interaction with the surface to be measured than others. The size and shape and/or profile of the stylus must be selected carefully. These features have an influence on the information obtained during the roughness measurement. Pins and sensors comprise slender shafts with contact tips or heads for measuring the roughness of surfaces on workpieces in a machine tool during the manufacturing process.

With the variants of the multidirectional measurement sensor disclosed here, the stylus has a cylindrical rod or a slender cone with a scanning head that is rotationally symmetrical with the central longitudinal axis of the stylus. A stylus is a narrow elongated shaft, similar in shape to a ballpoint pen. The stylus may be slightly cambered, so that it can be gripped more easily. For roughness measurements, the scanning heads are usually made of ruby, a hard metal or ceramic materials. Styluses or scanning heads come in contact with the workpiece to perform measurements of roughness. In general, the scanning head consists of a single piece of material, but a few styluses or scanning heads consist of an insert made of ruby or diamond, soldered, pressed or glued into/onto the head. The material of the scanning head may have an influence on the measurement. For example, the scanning head may be an $Al_2O_3$ ruby body made of synthetic monocrystalline ruby, a silicon nitride body made of hard pressed $Si_3N_4$, a zirconium oxide body made of sintered $ZrO_2$, a hollow body made of white aluminum $Al_2O_3$ sintered ceramic, a disk of silver steel, a simple silver steel disk made of silver steel, a silver steel cylinder disk made of silver steel, a cylinder disk made of synthetic ruby ending in a ruby body, a cylinder made of tungsten carbide, ending in a tungsten carbide disk, a silver steel disk made of silver steel with a peripheral edge angle of 30° to 120°, with a rounded peripheral edge made of tungsten carbide or some other material.

The rod or shaft may be made of different materials including nonmagnetic stainless steel, ceramic and carbon fibers. Disk-shaped scanning heads are thin sections of a double cone containing its equator.

A large disk diameter reduces the impact and/or pressure on the workpiece surface whose roughness is to be tested. A relatively slender shaft ensures flexibility in accessing certain measurement sites.

In another variant, the multidirectional roughness measurement insert may also permit, in addition to a roughness measurement, a determination of a measured value that is characteristic of the contour of a surface. Such a variant of the roughness measurement insert makes it possible to carry out both a contour measurement and a roughness measurement using the same tool insert. When using such a variant of the roughness measurement insert, it is not necessary to replace the tool insert to carry out the different measurements, which would claim additional cycle time in the event of a procedural application.

In one such variant, the multidirectional roughness measurement insert may have a stylus with a first scanning head for the roughness measurement and a second scanning head for the contour measurement. The first scanning head, corresponding to the variants of the roughness measurement insert described above, is at least one section of an essentially rotationally symmetrical and essentially disk-shaped first test body. The second scanning head may comprise at least one section of an essentially spherical or ellipsoidal test body. The second scanning head may be arranged on a distal end of at least one section of the shaft of the stylus. In this embodiment, the second test body may be essentially rotationally symmetrical to this section of the shaft. The contact point of the second scanning head may correspond to the lateral surface of the section of the second test body.

In a first variant, the first scanning head and the second scanning head may be arranged on a distal end of at least one section of the shaft of the stylus. The first test body and/or the second test body may be rotationally symmetrical to the section of the shaft. Alternatively, the axes of rotation of the first test body and/or of the second test body may not correspond to the axis of rotation of the section of the shaft. In addition, the stylus may have a test body comprising the first scanning head and the second scanning head, wherein the test body may be arranged on the distal end of one section of the shaft. The first scanning head may be arranged in a first region of the test head, and the second scanning head may be arranged in a second region of the test head, The first region and the second region may be on two opposite and/or adjacent sides of the test head. The test head may be provided in one or more pieces.

In a preferred embodiment, the test head had an essentially spherical or ellipsoidal shape, except for the first region in which the first scanning head is formed and except for a region in which the test head is connected to the section of the shaft. In the region of the second scanning head, the shape of the test body thus corresponds to the shape of the second test body. In this configuration, the test body may have a missing spherical and/or ellipsoidal section in the first region, such that a spherical and/or ellipsoidal surface is formed on the test head, The first scanning head may protrude centrally and/or orthogonally out of the circular or ellipsoidal surface. Alternatively, in the first region, the test head may have a section in the form of a cylindrical body on which the first scanning head is provided. The cylindrical body may be rotationally symmetrical with the first test body, wherein the radius of the cylindrical body is preferably smaller than the radius in the region of the largest diameter of the first test body.

In an alternative variant, the stylus may have the first scanning head arranged on a distal end of the first section of the stylus and may have the second scanning head arranged on a distal end of the second section of the stylus. In a preferred embodiment, the first section having the first scanning head is designed as the axial extension of the shaft of the stylus. The second section having the second scanning head may be arranged proximally in front of the first section on the shaft. In addition, the second section may be orthogonal to the first section. In another conceivable embodiment, the second scanning head is provided on the distal end of the first section, which is formed in the axial extension of the shaft, and the first scanning head is provided on the distal end of the second section arranged orthogonally to the shaft. Alternatively, the first section and the second section may be provided on the distal end of the shaft and orthogonally to it. The first section and the second section may be provided on opposite sides of the shaft. In addition, the longitudinal axes of the first section and of the second section may be orthogonal or parallel to one another. An embodiment in which the longitudinal axes of the first section and of the second section are equivalent is also conceivable.

The multidirectional roughness measurement insert can be moved by a machine tool into a measurement space relative to the surface of the workpiece to be measured. The roughness measurement insert, which functions through contact, detects the surface of the workpiece on contacting same. For each deviation in shape of the real workpiece surface from its ideal shape, the multidimensional roughness measurement insert delivers corresponding measurement data to its processing unit. The processing unit may contain a computer program. The waviness profile and the roughness profile can be determined there by digital filtering, and characteristic variables can be calculated, such as the arithmetic mean roughness, the square mean roughness, the depth of roughness, the maximum individual depth of roughness, the mean smoothing depth, the mean groove depth, the mean groove width, the corrugation depth, the profile depth, etc.

A stylus of the type presented here for use in a multidirectional roughness measuring instrument has a rod-shaped shaft and a scanning head mounted on the shaft, wherein the scanning head is at least one section of a test body that is at least essentially rotationally symmetrical to at least one section of the rod-shaped shaft, or the scanning head is at least one section of an essentially rotationally symmetrical test body arranged on a distal end of at least one section of the rod-shaped shaft. The essentially rotationally symmetrical test body has a double conical shape or a double truncated conical shape, A region of the largest diameter (equator) of the test body is designed as a contact point to a surface of a workpiece to be measured, wherein the contact point is formed by two double conical or double truncated conical lateral surfaces, and the contact point is rounded in the region of the largest diameter of the test body.

This can be seen in differentiation from the traditional roughness measurement devices, which use a diamond tip, for example, which is mounted laterally on a rod in the manner of a phonograph record player needle.

Measurements with these scanning heads, which do not conform to a standard, may lead to measured values which do not conform to a standard in the ongoing production process but instead the approximation values. However, these approximation values can easily be compared with quality assurance measurements by means of comparative measurements.

A roughness measuring method presented here for determining a measurement variable that is characteristic of the roughness of the surface of a workpiece uses a roughness measurement insert of the type described above. The following steps are carried out in this method:

Bringing the scanning head in contact with the surface to be measured, so that the scanning head assumes a predefined deflection out of its resting position;

Adjusting the test load by additional approach or retraction of the roughness measurement insert in relation to the surface to be measured, wherein the adjustment of the test load (pressing force of the scanning head based on the contact surface of the scanning head on the surface to be measured) as a function of the shape of the scanning head and the shape of the surface of the workpiece to be measured;

Activating a "roughness measurement" mode, in which measurement signals detected as described below are recorded and/or processed;

Traveling a predetermined measurement distance along a predetermined measurement direction;

Converting the movements of the stylus into measurement signals that are characteristic of the roughness of the surface and optionally recording them and/or processing the measurement signals;

Evaluating the measurement signals to determine at least one measurement variable that is characteristic of the roughness of a surface; and Sending at least one measurement variable thereby determined to a machine control unit.

With this roughness measurement method, the step of bringing the scanning head into contact with the surface to be measured can be carried out by the approach of the roughness measurement insert in a machine tool relative to the surface of the workpiece to be measured.

The step of traveling a predetermined measurement distance along a predetermined measurement direction may comprise either specifying a path distance to be traveled by the scanning head or specifying a period of time during which the scanning head will travel the measurement distance, and the predetermined measurement direction may comprise any direction to be selected along the surface to be measured.

The step of evaluation of the measurement signals—in a processor in the roughness measurement insert or downstream—may comprise saving and linking the measurement signals recorded by means of the analog sensor to form at least one of the measured values that are characteristic of the roughness of the surface: arithmetic mean roughness, average peak-to-valley height, square mean roughness, maximum individual depth of roughness, depth of roughness, mean smoothing depth, mean groove depth, mean width of scoring, corrugation depth, profile depth. In addition, information about design deviations of the first and second order may also be supplied.

The step of evaluation of the measurement signals recorded by means of the analog sensor also comprises a processing of the measurement signals by means of a profile filter because otherwise the waviness will falsify the roughness value. A profile filter, for example, a digital phase-corrected Gaussian filter, separates the unfiltered primary profile (P profile) into roughness (R profile) and waviness (W profile). The roughness profile is the primary profile deviation from waviness (R=P−W). The reference line and/or the center line in the roughness profile is/are the line corresponding to the long-wave profile fractions, which are determined by the Gaussian filter and are suppressed. When using the Gaussian filter, the distortions in the profile in the vertical direction are reduced due to the sudden change in height of the profile. The phase shift in the horizontal direction is completely omitted. To determine the center line, the weighted arithmetic mean of the ordinate heights is calculated at each point with the help of the Gaussian filter. In order for points at the beginning and end of the measurement zone to also be weighted correctly, the scanning distance must be longer than the total distance for fade-in and fade-out of the filter. The forward distance and the trailing distance of half the cut-off wavelength each are customary at any rate.

The cut-off wavelength of a profile filter is the wavelength at which the filter reduces the amplitude of a sinus wave by one-half. It may thus be understood to be a measure for the boundary between roughness and waviness. The cut-off wavelength defines the transition from roughness to even shorter wavelengths and the cut-off wavelength delimits the waviness with respect to longer wavelengths. The cut-off wavelengths in the case of periodic profiles are to be selected according to the average groove width and in the case of aperiodic profiles according to roughness value to be measured. The total measuring distance of a measurements is always five times the cut-off wavelength. The scanning distance is six times the cut-off wave-length. The amplitude of the filtered roughness profile decreases at a lower cut-off wavelength, and the amplitude of the waviness profile increases at a lower cut-off wavelength. Smaller roughness values are therefore also measured at shorter cut-off wavelengths.

Roughness parameters are calculated from the filtered profile. The cut-off wave-length used is therefore relevant in comparative measurements in particular. The primary profile, the waviness and roughness are differentiated. The value of a profile characteristic variable is obtained by averaging the individual results of individual measurement distances directly one after the other.

The arithmetic mean roughness is the arithmetic mean of the amounts of the ordinate values of the roughness profile inside the individual measurement distance. It represents the mean deviation of the profile from the center line.

The mean roughness value cannot differentiate between peaks and valleys, nor can it recognize different profile shapes. Its definition is based on a strong averaging.

The square mean roughness value is the square mean value of the profile deviation. It is defined like the mean roughness value but it has a more sensitive response to individual peaks and grooves.

The average peak-to-valley height is the sum of the height of the largest profile peak and the depth of the largest profile valley within a single measurement distance. The average peak-to-valley height is usually obtained by averaging the results of five individual measurement distances. On the whole, the average peak-to-valley height shows a more sensitive response to a change in surface structure than does the mean roughness value.

The maximum individual peak-to-valley height is the largest individual peak-to-valley height.

The peak-to-valley height is the vertical difference between the deepest valley and the highest peak within the total measurement distance.

The following roughness parameters are of assistance in "horizontal" characterization of a profile.

The definition of the average smoothing depth is almost identical to that of the average peak-to-valley height. The filtered profile is divided into five equal distances corresponding to the cut-off wavelength. In contrast with the determination of the average peak-to-valley height, the distance from the center line to the highest peak is determined in each segment here. The average smoothing depth is the arithmetic mean of these five values.

The average peak-to-valley height is formed like the average smoothing depth. The reference depths are used instead of the peak heights.

In the case of bearing surfaces, grooves serve as pockets of lubricant, for example. Peaks in turn are not desirable because they increase both friction and wear. In the case of interference fits, it is often common to work with the average smoothing depth because interference fits require the largest possible contact area.

The average groove width is the arithmetic mean of the widths of the profile elements of the roughness profile within a single measurement distance. A profile element here is a profile elevation with a neighboring recess. The average groove width is obtained by averaging the results of five individual measurement distances. It is used in periodic profiles for selecting the cut-off wavelength of the filter.

The corrugation depth indicates the maximum depth of the filtered profile after the roughness has been filtered out.

The profile depth is the distance between two parallel lines enclosing the unfiltered surface profile. The lines are in the form of the ideal profile (e.g., straight line, circle).

The roughness measurement method described here is characterized in that the above method steps are carried out on a machine tool, wherein the roughness measurement insert is used instead of a tool in a spindle on the machine tool and the measurement signals and/or the measured variable is/are output to a machine controller of the machine tool.

The method steps can be performed before and/or after processing steps by means of at least one tool on the workpiece in the machine tool.

The multidirectional roughness measurement insert may be oriented along a predetermined measurement direction in the step of traveling along a predetermined measurement distance, so that the contact point of the test body has a feed direction, which is oriented at least approximately in the axial direction of the larger radius of the test body, and the tangential direction of the larger radius is aligned at least approximately in parallel with a groove direction to be measured on the workpiece.

The roughness measurement inserts presented here offer the following advantages:

(a) Minimizing rejects due to direct monitoring of the manufacturing process
(b) Rotary and milling tools can be operated up to their wear limit without any negative effect on the peak-to-valley height
(c) Higher productivity and process reliability due to the omission of manual and downstream tests.

The roughness measurement inserts presented here for measuring workpiece surfaces can be integrated directly into the machining operation. Due to the process-integrated monitoring of the workpiece surfaces, the manufacturing processes are much more efficient than previously.

A possible reduction in the downtime of the machine tool is achieved by eliminating tedious manual roughness measurements. The cost for rejects due to immediate reworking are minimized. Tools can be operated up to their wear limit and need not be replaced as a precautionary measure.

BRIEF DESCRIPTION OF THE DRAWINGS

The drawings illustrate embodiments and modifications of the multidimensional roughness measurement insert using the stylus in a scanning head, which is rotationally symmetrical with the central longitudinal axis of the scanning pin.

FIGS. 5*a* and 5*b* show variants of the multidimensional roughness measurement insert, in which the rod-shaped shaft is bent at an angle and coupled to the transmission element by a coupling element.

FIGS. 6 through 10 show variants of scanning heads for roughness measurement inserts having different shapes and dimensions.

FIG. 11 shows another variant of a roughness measurement insert in a partially cut-away schematic diagram from the side.

DETAILED DESCRIPTION OF THE DRAWING

Figure 1:
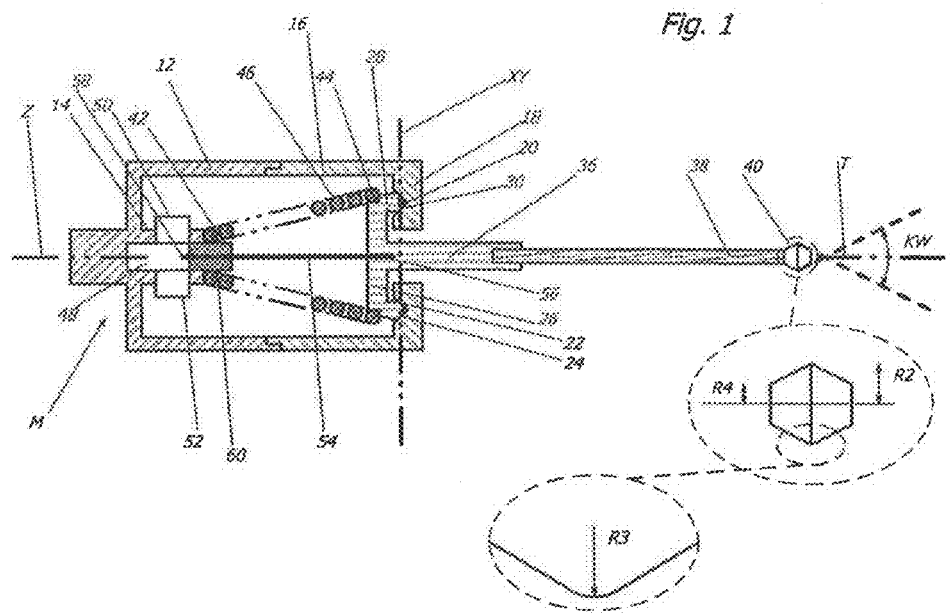
FIGS. 1 and 2 show schematic sectional diagrams of a multidirectional roughness measurement insert from the side in the resting position (FIG. 1) and/or in the deflected position (FIG. 2).
Figure 2:
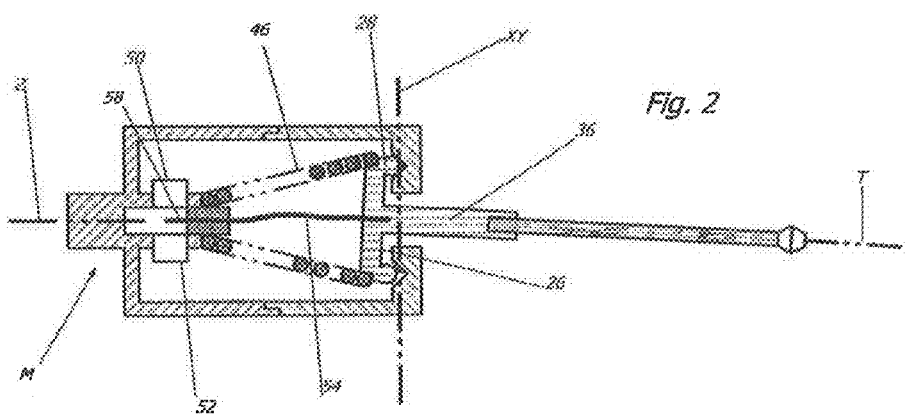

The multidirectional roughness measurement insert M shown in the resting position and in a deflected position in FIGS. 1 and 2 has an essentially cylindrical housing, which is made up of a proximal housing part 12 shown at the top in the drawings with an attachment 14, on the one hand, and a distal housing part 16, which is a lower part in the drawings and has a housing flange 18 protruding radially downward, on the other hand.

The two housing parts 12 and 16 of the roughness measurement insert M are tightly and fixedly joined to one another, for example, being screwed directly to one another. An annular support bearing 20 in the form of an annular groove is formed on the proximal upper side of the housing flange 18 in the drawings extending radially inward. This annular groove has a convex truncated conical surface 22 on the inside radially and has a concave truncated conical surface 24 on the outside radially. With the measurement sensors shown here, these two truncated conical surfaces are arranged approximately at right angles to one another in the axial cross section. In one variant, the concave truncated conical surface 24 on the outside radially is steeper, for example, inclined by 75° to the plane of the distal end face of the housing flange 18. It is expedient in this case if the truncated conical surfaces 22 and 24 are coated with or manufactured from a friction reducing material.

A mushroom-shaped carrier body 26 with an annular counter bearing 28 formed on it is arranged inside the distal housing part 16 of the roughness measuring insert M.

The counter bearing 28 has a cross section that is approximately semicircular or is made up of a plurality of curved sections with different radii and can be designated in any case as an annular bead. In FIG. 1 the carrier body 26 has assumed a resting position in which the counter bearing 28 is in contact with the support bearing 20 along a planar circular contact line 30, but nowhere else. This circular line of contact lies on the convex radially inner truncated conical surface 22 of the annular support bearing 20. However, the annular counter bearing 28 is only a minimal distance away, preferably a few μm (240 μm), from the concave truncated conical surface 24 on the outside radially as long as the carrier body 26 is in its resting position. This distance may drop to the level of zero at one location, i.e., the carrier body 26 may assume a slightly eccentric resting position, in which the counter bearing 28 is in contact with the concave truncated conical surface 24 on the outside radially of the support bearing 20 at one point. The plane of the line of contact 30 is referred to below as the bearing plane X, Y. The axis of the measuring sensor M, i.e., of its housing 12, 14, which is designated as the central axis Z, runs at a right angle to this plane, i.e., orthonormal to it. The carrier body 26 has its own longitudinal axis T, which practically corresponds to the central axis Z in the resting position and in purely axial deflection of the carrier body 26.

If the carrier body 26 of the roughness measurement insert M is deflected out of its resting position by tilting as shown in FIG. 2, for example, then the annular counter bearing 28 comes in contact with the concave truncated conical surface 22 on the inside radially of the annular support bearing 20 at only one point of contact 32. In addition, the counter bearing 28 contacts the concave truncated conical surface 24 of the support bearing 20 on the outside radially at a point of contact 34 on the outside radially.

The carrier body 26 of the roughness measuring insert M is equipped with a central stylus holder 36, which extends along the longitudinal axis T in the distal direction and can be displaced in the direction of the longitudinal axis T on the carrier body 26 of the roughness measurement insert M. The stylus holder 36 is intended for holding a replaceable stylus 38 that has a scanning head 40.

With the measuring insert M shown in FIGS. 1 and 2, a circular spring seat 42, which is concentric with the central axis Z, is formed on the distal end of the shoulder 14 within the proximal housing part 12 and is opposite a spring seat 44, which is also in the form of a circular ring designed to be concentric with the longitudinal axis T on the proximal side of the carrier body 26. A helical spring 46 coiled in the form of a truncated cone is damped between these two spring seats 42 and 44, constantly tending to keep the carrier body 26 in its resting position.

The shoulder 14 of the proximal housing part 12 has an axial borehole 48, i.e., concentric with the central axis Z, starting from the interior of the housing 10, with an analog sensor 50 protruding radially into the borehole and diametrically opposite the sensor, and an emitter 52 for a measurement beam. In the examples shown here, the emitter 52 is a light source, which, together with the sensor 50, forms a miniature light barrier with an analog output signal, for example, a PSD (English position sensitive detector). These PSD components make use of the effect of lateral division of the photoelectric current that is generated. A PSD designates a component based on silicon pin diode technology, enabling measurement of the position of the integral center of an impinging light signal. A PSD converts the energy of a light spot imaged on it, for example, into a continuous electric signal corresponding to the position of the center of this spot. The position of one direction is determined from the ratio of two output currents. However, other sensor arrangement can also be used.

Any deflection of the scanning head 40 and thus also of the stylus holder 36 out of its resting position is reported to the sensor 50 by a transmission element 54, which is a thin, straight, bending rod, preferably made of drawn spring steel wire with a circular cross section and a diameter of 0.5 to 1.2 mm. Therefore, the measurement beam from the emitter 52 is shadowed more or less broadly with respect to the resting position, as illustrated in FIG. 2. This is evaluated in an electronic unit that is not illustrated further here. A spring steel wire with a diameter of 0.8 mm has proven successful in particular for the roughness measurement insert M. However, spring steel wire with a much smaller diameter of 0.2 mm is also used.

In the resting position, the transmission element 54 extends in a straight line along the central axis Z of the roughness measurement insert M. Its distal end 56 is fastened centrally onto the stylus holder 36. Close to its proximal end 58, the transmission element 54 is guided in a guide bush 60. The guide bush 60 may be made of a material such as polyamide or sintered bronze that has a low coefficient of friction in comparison with the material of the transmission element 54 (drawn spring steel wire). However, an alternative in which the guide bush 60 is a commercial hardened bore bushing with a polished borehole has proven successful. In this case, the transmission element 54 is coated with a friction-reducing material on the section adjacent to its proximal end 58.

In the resting position, the proximal end 58 of the transmission element extends beyond the proximal end of the guide bush 60, ranging into the center of the beam of light emitted by the emitter 52 in the direction of the sensor 50.

The transmission element 54 here is made of spring steel wire whose usable length for bending corresponds to the distance between the distal end of the guide bush 60, i.e., the lower end in the drawings, and the proximal end, i.e., the upper end face of the carrier body 26. Instead of the spring steel wire, a rigid pin, which is in a pendulum mount may also be used.

The annular support bearing 20 formed on the distal housing part 16 and the annular counter bearing 28 formed on the carrier body 26 are each formed by a face gear in one variant. Therefore, in its resting position as well as all radial deflections of the scanning head 40 carried by it, the carrier body 26 is prevented from rotating about its longitudinal axis T. One of the two cooperating gears is rounded in a curved shape in one variant. The gears can thus roll against one another in tilting of the carrier body 26.

The pin-shaped component, i.e., a stylus, shown in FIG. 1 has a rod-shaped shaft or pin 38 and a scanning head 40 mounted on the pin 38. The rod-shaped shaft 38 is made of hard metal in this variant. It is naturally also possible to use different materials for the rod-shaped shaft 38 and the scanning head 40. The scanning head 40 has a double conical shape and can be manufactured from ruby or diamond, which is/are glued onto the rod-shaped shaft 38. The scanning head 40 may be, for example, an $Al_2O_3$ ruby double cone made of synthetic monocrystalline ruby, a double cone made of silicon nitride from hard pressed $Si_3N_4$, a double cone made of zirconium oxide from sintered $ZrO_7$, a hollow double cone made of white aluminum $Al_2O_3$ sintered ceramic, a double cone made of tungsten carbide or a double cone made of some other hard material.

The double conical scanning head 40 is manufactured in one piece but can also be imagined as formed from two symmetrical truncated cones with a small radius R4 at both ends of the scanning head 40 and the largest radius R2 at the equator of the scanning head 40. Since the pin-shaped component in FIG. 1 is symmetrical in general, the small radius R4 on the proximal section PP of the scanning head 40 is identical to the small radius R4 on the distal section DP of the scanning head 40. Since the two covering surfaces of the double conical scanning head 40 are oriented in parallel to one another, the scanning head 40 has in general a barrel shape or a disk shape, With the pin-shaped component from FIG. 1 the scanning head 40 has a ratio of the small radius R4 to the radius R2 at the equator of 0.5 to 1. The annular edge is rounded with a radius R3 in the region of the equator.

With the pin-shaped component according to FIG. 1, the double conical scanning head has a cone angle KW of approx, 55°.

The scanning head 40 may also have an asymmetrical double cone shape in general. This means that the equator (Le., the section of the largest diameter or radius of the scanning head 40) is not located at the center of the double cone.

The measuring force of the roughness measurement insert presented here is usually greater than that of a traditional stylus instrument, To keep the load on the work-piece surface within acceptable limits, instead of the usual test cone with a rounded, a disk-shaped test body is used. A test body geometry that is optimal for the measurement task is defined as a function of the expected peak-to-valley height, feed, tool geometry, workpiece geometry and strength of the material.

To do so, let us consider the Hertzian pressure pH against a planar steel surface: In standard stylus instrument HOMMEL-ETAMIC, a Hertzian pressure pH=6800 MPa and a pressure ellipsis of 0.3 μm×0.3 μm are obtained with an R5 μm tip, a pressing force of F=1.6 mN.

On the other hand, an arrangement of the roughness measurement insert presented here with a disk having the largest diameter at the equator ø 3 mm yields a Hertzian pressure pH=7840 MPa and a pressure ellipsis of 1.0 μm×23 μm at an edge radius of R=10 μm, a pressing force of F=0.36 N.

Additional examples of the roughness measurement insert presented here include:
Disk ø 3–R=20 μm, F=0.36 N: pH=5670 MPa, pressure ellipsis: 1.4 μm×22 μm
Disk ø 3–R=40 μm, F=0.36 N: pH=4110 MPa, pressure ellipsis: 2.0 μm×21 μm The feed direction V in the case of the roughness measurement insert presented here is aligned in general in the axial direction of the largest radius. The tangential direction of the largest radius is aligned in parallel to the direction of the groove in the workpiece in the examples. With this arrangement, the peripheral line of the test body or scanning head 40 can reach the valley of the machining grooves (see FIG. 4, for example).

Figure 3:
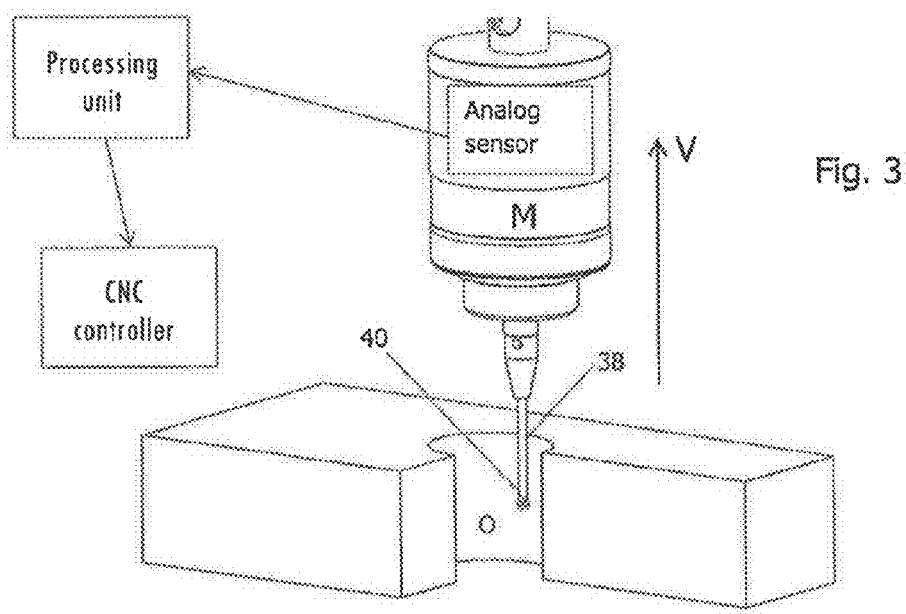
FIG. 3 illustrates a measurement of roughness using a multidirectional roughness measurement insert in a workpiece.

FIG. 3 illustrates how the multidirectional roughness measurement insert M is to be used for measuring the roughness in a borehole in a workpiece O.

Figure 4:
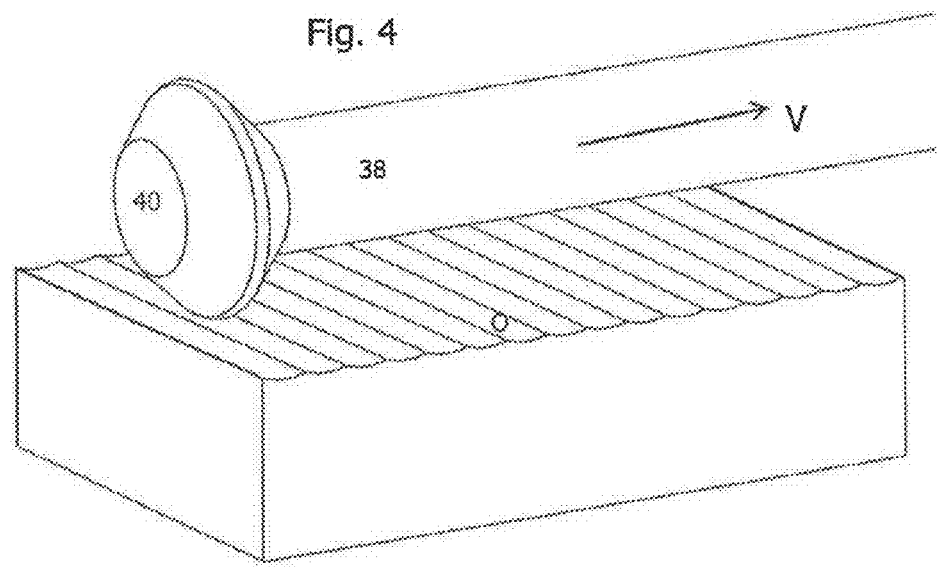
FIG. 4 illustrates a measurement of roughness using a multidirectional roughness measurement insert at the surface of a workpiece.

FIG. 4 illustrates how the multidirectional roughness measurement insert M is to be used for measuring the roughness on a surface on a workpiece O.

With the variant of the multidirectional roughness measurement insert M shown in FIG. 5, the rod-shaped shaft 38 is coupled by a coupling element at an angle of approx. 25° to the transmission element. If a surface of a workpiece cannot be reached with such an arrangement, it is also possible to have an angle bend of approx. 90° in the shaft (see FIG. 5*a*).

FIGS. 6 through 10 show variants of scanning heads 40 with different shapes and dimensions.

in FIGS. 3 through 9, the contact point of the test body has a double conical shape or double truncated conical shape with a radius of approx. 0.4 mm to approx. 3 mm in the region of the largest diameter, with an edge radius of approx. 5 μm to approx. 50 μm, and the respective cone angle is approx. 30° to approx. 130°.

FIG. 10 in particular shows an arrangement in which the scanning head 40 is formed in the axial extension of the rod-shaped shaft 38. Here again, a feed direction V normal to the largest radius is provided.

In one variant the two cone angles may be approx. 90°, the radius in the region of the largest diameter may be approx. 1.5 mm and the edge radius may be approx. 40 μm. In another variant, the two cone angles may be approx. 120°, the radius in the region of the largest diameter may be approx. 1.1 mm and the edge radius may be approx. 10 μm. In another variant, the two cone angles may be approx. 60°, the radius in the region of the largest diameter may be approx. 1.5 mm and the edge radius may be approx. 20 μm.

In the figures, the feed direction is always indicated in one direction. However, it is also possible to move the roughness measurement inserts presented here in the opposite direction from the roughness measurement.

FIG. 11 illustrates another variant of a roughness measurement insert. The measuring unit here is modified so that it is to be used only along an axis A to the roughness measurement.

This roughness measurement insert has a housing 100 out of which protrudes a thin sensor holder 110 with a unidirectionally deflectable analog measurement module 120 A processing unit with an electronic analyzer 130 is accommodated in the housing 100 for the measurement signals that are detected by the measurement module and are characteristic of the roughness of a surface of a workpiece, Furthermore, a wireless infrared or radio module 140 is provided in the housing 100 for data transmission of the roughness data thereby determined to a CNC controller or an interface upstream from the CNC controller.

The unidirectionally deflectable analog measurement module 120 has a pivot arm 122, which is held by a spring joint 124 in the form of an essentially rectangular spring plate in the shaft with a pivot distance of approx, ±0.15-035, e.g., 0.25 mm. Furthermore, the spring joint 124 in the form of a plate spring ensures that the pivot arm cannot migrate laterally. Therefore, the one side of the spring plate is fastened by two screws 125 to a sensor base, which is in turn fastened in the thin sensor holder 110. The other side of the spring plate is bolted to the pivot arm 122 using two screws. A journal 126, which protrudes into a measurement beam of a light barrier 128 and shatters it to a lesser or greater extent, depending on the degree of deflection of the pivot arm, is arranged on the pivot arm 122. The basic position of the journal 126 in the resting position of the pivot arm 122 is adjustable by a screw 127, which secures the angular position of the pivot arm 122 in the resting position with respect to the thin sensor holder 110. A scanning head 40 of the type described above, in particular in FIG. 10 but also one of the other variants is possible in the region of the free end of the pivot arm 122; this scanning head is to be brought into contact with a surface of a workpiece in order to measure its roughness. To do so, the roughness measurement insert is inserted into the spindle of a machine tool, and, controlled by the CNC controller of the machine tool, moved over the surface of the workpiece This roughness measurement insert may be connected radially or axially by flange to the spindle of the machine tool.

In addition to the output of the roughness measured values to the machine controller, the interface 150 upstream from the CNC controller presents the results in graphical form. This can be used for documentation and analysis. It is thus possible to detect surfaces that must be evaluated as out-of-specification at a point in time close to the process. Performing measurements in the original chucking in the machine tool yields the simple possibility of reworking. This in turn makes it possible to minimize rejects due to peak-to-valley height.

The measurement module can achieve a measurement force of approx. 50 mN with this embodiment. This is achieved by the low spring force and the small moving masses. With lower measurement forces in comparison with the multidimensional measuring unit, the scanning head may also be provided with smaller radii without resulting in the Hertzian pressure becoming too high. The roughness measurement is thus at least approximately in compliance with the standard.

Figure 12A:
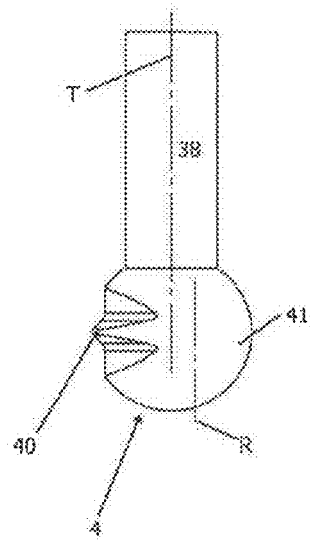
FIGS. 12*a* to 12*c* and 13*a* to 13*c* show additional variants of styluses for roughness measurement inserts having two scanning heads for performing the roughness measurements and contour measurements.
Figure 12B:
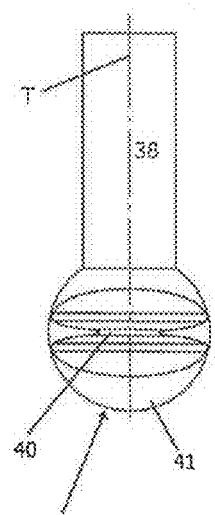
Figure 12C:
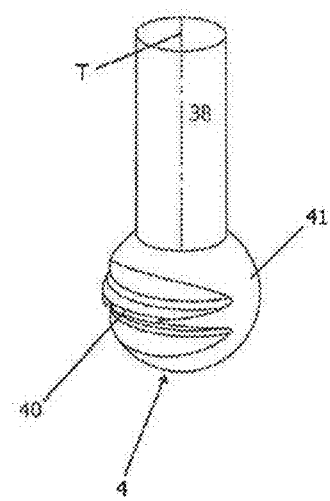
Figure 13A:
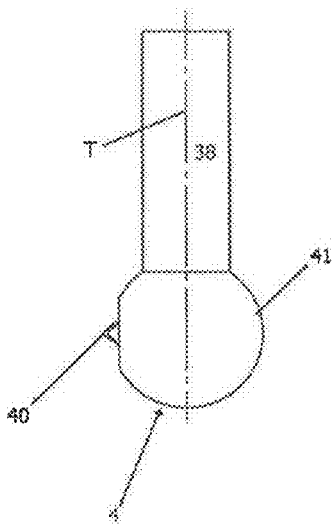
Figure 13B:
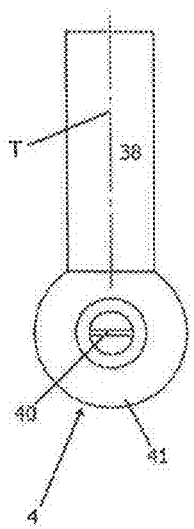
Figure 13C:
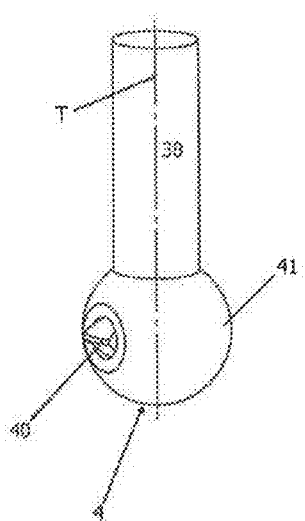

FIGS. 12a to 12c show a first variant and FIGS. 13a to 13c show a second variant of a stylus with a first scanning head 40 for measuring the roughness and a second scanning head 41 for measuring the contour. The stylus here has a cylindrical shaft 38 with a test head 4 arranged on its lower end in the axial direction, comprising the first scanning head 40 and the second scanning head 41. Except for a region in which the scanning head 40 is formed and except for the region in which the test head 4 is connected to the shaft 38, the test head 4 has an almost spherical shape. FIGS. 12a and 13a each shows a side view of the first scanning head 40 of the respective stylus in which the first scanning head 40 is arranged on the left side of the test head 4. In contrast with that, FIGS. 12b and 13b show a frontal view of the first scanning head 41 of the respective stylus, in which the stylus has been rotated to the right around the shaft 38 by an angle of approx. 90° in comparison with the diagram in FIG. 12a and/or FIG. 13a. In addition, FIGS. 12c and 13c also show three-dimensional diagrams of the respective styluses.

The first scanning head 40 is designed as a section of a first test body with a double truncated conical shape. The first test body is rotationally symmetrical with an axis of symmetry running parallel to the longitudinal axis of the cylindrical shaft T. The contact point of the first scanning head 40 lies in the region of the largest radius of the first test body, wherein the feed direction is provided as being normal? to the contact point for the roughness measurement. Wouldn't it be better as "in the longitudinal axis of the shaft"? The second scanning head 41 is a section of a spherical second test body, which is rotationally symmetrical with the longitudinal axis of the shaft T and corresponds to the spherical section of the test head 4. The contact point of the second scanning head 41 thus corresponds partially to the lateral surface of the test head 4 and preferably extends from a region formed on the opposite side from the first scanning head to a region on the lower distal end of the test head 4.

FIGS. 12a to 12c illustrate a first variant of the stylus. In this embodiment, the first test body is rotationally symmetrical to the axis of rotation R, which is parallel to the longitudinal axis of the shaft T but does not correspond to the latter. The radius in the region of the largest diameter of the first test body, i.e., the distance between the contact point of the first scanning head 40 and the axis of rotation R, corresponds approximately to the sum of the radius of the second test body and the distance between the longitudinal axis of the shaft T and the axis of rotation R. In the region of the first scanning head 40, the test head 4 has a section of a cylindrical body, which is also rotationally symmetrical to the axis of rotation T and on which the first scanning head 40 is formed centrally on the lateral surface. The radius of the cylindrical body is smaller here than the radius in the region of the largest diameter of the first test body. In this region, the shape of the test head 4 corresponds to the cut quantity of the first test body and of the second test body.

FIGS. 13a to 13c illustrate a second variant of the stylus in which the test head 4 has a missing spherical section in the region of the first scanning head 40 and thus has a circular area. In this embodiment, the first scanning head 40 is formed in an axial extension of a rod-shaped pin, which protrudes centrally out of the circular surface of the test head 4 and is arranged orthogonally to the latter. Except for the region excluded for the test head 40, the spherical test bodies 41 according to FIGS. 12 and 13 may be used like a standard stylus for scanning in different vector directions.

Figure 14A:
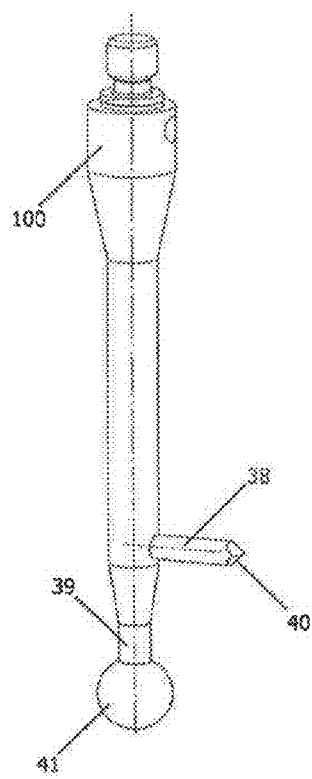
FIGS. 14*a* to 14*c* illustrate additional variants of a roughness measurement insert in which two scanning heads are arranged on different sections of a stylus for performing roughness and contour measurements.
Figure 14B:
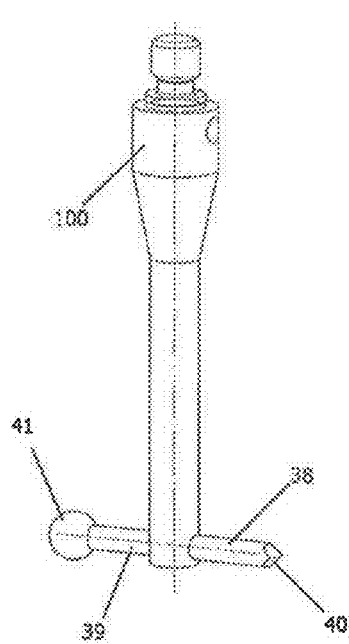
Figure 14C:
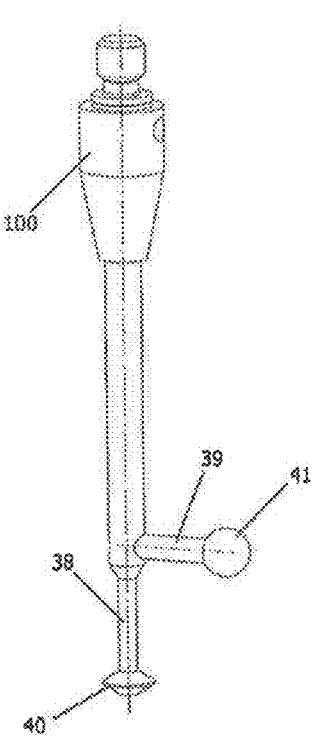

FIGS. 14a to 14c show variants of roughness measurement inserts with a first scanning head 40 for the roughness measurement and a second scanning head 41 for measurement of the contour, these two scanning heads being located in different sections of a stylus.

FIGS. 14a illustrates a first embodiment of such a roughness measurement insert. This shows a roughness measurement insert with a housing 100 (concept "housing" has already been used in the description of the measuring unit starting on page 7 and is not applicable here. The part labeled as 100 is actually just a thickened area of the shaft) on which a cylindrical shaft is arranged in the axial direction, extending in the direction of the distal end of the roughness measurement insert. On the distal end of the shaft are also arranged a cylindrical first section 38 and a cylindrical second section 39. The first scanning head 40 is formed on the distal end of the cylindrical first section 38, whereas the second scanning head 41 is formed on the distal end of the cylindrical second section 39. In FIG. 14*a*, the cylindrical second section 39 is designed as the axial extension of the shaft. Proximally upstream from the cylindrical second 39 is arranged the first cylindrical section 38 orthogonally to the former. The first scanning head 40 is formed in the axial extension of the first cylindrical section 38. The first scanning head 40 is a section of a first test body having a double truncated conical shape, in which the contact point is located in the region of the largest radius. The feed direction for the roughness measurement is normal to the largest radius of the first test body and/or parallel to the shaft. The second scanning head 41 corresponds to a spherical second test body whose radius is larger than the radius of the cylindrical second section 39, except for a region in which the second cylindrical section 39 is connected to the second scanning head 41. The second scanning head 41 is rotationally symmetrical to the cylindrical second section 39.

Since the additional embodiments of the roughness measurement insert shown in FIGS. 14*b* and 14*c* and the preceding embodiment shown in FIG. 14*a* resemble one another, and similar components are shown with the same reference numerals, the remaining description will mention only the differences in comparison with the previous embodiment.

FIG. 14*b* illustrates a variant of the roughness measurement insert, in which the cylindrical second section 39, on whose distal end the second scanning head 41 is formed is also provided orthogonally to the shaft. In this embodiment, the cylindrical first section 38 and the cylindrical second section 39 are arranged on opposite sides of the shaft, such that they correspond in their longitudinal axes.

FIG. 14*c* shows another embodiment, in which the second cylindrical section 39 with the second scanning head 41 is arranged orthogonally to the shaft, whereas the first cylindrical section 38 with the first scanning head 40 is formed in the axial extension to the shaft. The first scanning head 40 has a double truncated conical shape and is rotationally symmetrical to the first cylindrical section 38, wherein the contact point is situated in the region of the largest radius of the first scanning head 40. The feed direction for the roughness measurement is therefore parallel to the longitudinal axis of the shaft in accordance with the preceding embodiments.

It should be pointed out that although numerical ranges and numerical values have been disclosed here, all the numerical values between the disclosed values and the numerical subrange within the aforementioned ranges are also to be regarded as disclosed. It should also be pointed out that, whereas the number given is between the various dimensions of the pin-shaped component described here, each specific pin-shaped component of the type described here need not necessarily implement each and every one of the ratios between the various dimensions specified here.

The invention claimed is:

1. A multidirectional roughness measurement insert for determining a measured variable that is characteristic of the roughness of a surface, having
a rotationally symmetrical measuring unit, comprising
a carrier body, on which is arranged a stylus holder for holding a stylus, and
an analog sensor, which converts the deflections of the stylus in any direction into measurement signals that are characteristic of the roughness of the surface of a workpiece, and the stylus to be coupled to the carrier body, comprising
a rod-shaped shaft and
a scanning head mounted on the shaft, wherein
the scanning head is at least one section of a test body, which is essentially rotationally symmetrical to at least one section of the rod-shaped shaft, or wherein
the scanning head is at least one section of an essentially rotationally symmetrical test body, which is arranged on a distal end of at least one section of the rod-shaped shaft, and wherein
the scanning head is at least one section of an essentially rotationally symmetrical test body arranged on a distal end of at least one section of the rod-shaped shaft, and wherein
the test body has a double conical shape or a double truncated conical shape, and a region of the largest diameter of the test body is formed as the contact point to a surface of a workpiece to be measured, and wherein
the contact point is formed by two double conical lateral surfaces or double truncated conical lateral surfaces, and the contact point is rounded in the region of the largest diameter of the test body.

2. The multidirectional roughness measurement insert according to claim 1, wherein the rod-shaped shaft is coupled directly or indirectly in a linear extension to the transmission element or is coupled to the transmission element at approximately 0° to approximately 100°.

3. The multidirectional roughness measurement insert according to claim 1, wherein the contact point is defined as a function of the expected peak-to-valley height, the distance to be traveled per revolution or per stroke in the feed direction of the workpiece or of the roughness measurement insert, the forward feed or the tool geometry, the workpiece geometry and the strength of the material.

4. The multidirectional roughness measurement insert according to claim 1, wherein the contact point of the test body has a double conical shape or a double truncated conical shape, each with cone angles of approximately 30° to 130°.

5. The multidirectional roughness measurement insert (M) according to claim 4, wherein the contact point on the test body in the region of the largest diameter has a radius of approximately 1.5 mm to approximately 5 mm or 0.4 mm to approximately 3 mm, and the respective cone angle is approximately 30° to approximately 130°.

6. The multidirectional roughness measurement insert according to claim 1, wherein the contact point of the test body in the region of the largest diameter has an edge radius of approximately 5 µm to approximately 50 µm and wherein the curvature of the contact point of the test body has a constant value, or the curvature changes along a curved region of the contact point of the test body.

7. The multidirectional roughness measurement insert according to claim 5, wherein the contact point of the test body has a feed direction, which is oriented at least approximately in the axial direction of the larger radius, wherein the scanning head is equipped to be moved in the feed direction over the surface of the workpiece.

8. The multidirectional roughness measurement insert according to claim 1, having a processing unit coupled to the analog sensor to determine from the measurement signals a measured variable that is characteristic of the roughness of a surface, wherein the processing unit is either arranged in the housing of the roughness measurement insert or is separate therefrom.

9. The multidirectional roughness measurement insert according to claim 1, wherein the stylus also comprises a second scanning head, wherein the second scanning head is at least one section of an essentially spherical or ellipsoidal test body, which is arranged on a distal end of at least one section of the rod-shaped shaft of the stylus.

10. A roughness measurement method for determining a measured variable that is characteristic of a roughness of a surface of a workpiece, having a multidirectional roughness measurement insert, comprising:
   a) approaching a scanning head to the surface to be measured, so that the scanning head assumes a predefined deflection out of its resting position;
   b) setting a test load by further approach or retraction of the roughness measurement insert in relation to the surface to be measured, wherein the test load is adjusted as a function of a shape of the scanning head and the shape of the surface of the workpiece to be measured;
   c) activating a "roughness measurement" mode, in which subsequently detected measurement signals are recorded and/or processed;
   d) traveling along a predetermined measurement distance along a predetermined measurement direction;
   e) converting the movements of the stylus into measurement signals that are characteristic of the roughness of the surface;
   f) evaluating the measurement signals to determine at least one measured variable that is characteristic of the roughness of the surface; and
   g) sending at least one measured variable thus determined to a machine controller.

11. The roughness measurement method according to claim 10, wherein step a) is to bring the scanning head to the surface to be measured by the approach of the roughness measurement insert in a machine tool in relation to the surface of the workpiece to be measured by scanning.

12. The roughness measurement method according to claim 10, wherein step d) of traveling a predetermined measurement distance along a predetermined measurement direction comprises either stipulation of a path distance to be traveled by the scanning head or stipulation of a period of time during which the scanning head travels the measurement distances, and the predetermined measurement direction comprises any direction to be selected along the surface to be measured.

13. The roughness measurement method according to claim 10, wherein step f) of analyzing the measurement signals comprises saving and linking the measurement signals to form at least one of the measured variables that are characteristic of the roughness of the surface: arithmetic mean roughness, average peak-to-valley height, square mean roughness, maximum individual peak-to-valley height, peak-to-valley height, mean smoothing depth, mean depth of groove, mean width of groove, depth of wave, depth of profile.

14. The roughness measurement method according to claim 10, wherein steps a) through g) are carried out in a machine tool, wherein the roughness measurement insert is used in a spindle of the machine tool instead of using a tool and the measurement signals and/or the measured variable is/are output to a machine controller of the machine tool.

15. The roughness measurement method according to claim 10, wherein steps a) through g) are carried out before and/or after machining steps by means of at least one tool on the workpiece in the machine tool.

16. The roughness measurement method according to claim 10, wherein the roughness measurement insert in step d) of traveling over a predetermined measurement distance along a predetermined measurement direction is oriented so that the contact point of the test body has a feed direction, which is oriented at least approximately in the axial direction of a larger radius of the test body, and the tangential direction of the larger radius is at least approximately parallel to a groove direction of the workpiece to be measured.

* * * * *